US012117942B2

(12) United States Patent
Vittimani et al.

(10) Patent No.: US 12,117,942 B2
(45) Date of Patent: Oct. 15, 2024

(54) PROCESSING SYSTEM, RELATED INTEGRATED CIRCUIT, DEVICE AND METHOD

(71) Applicants: STMicroelectronics S.r.l., Agrate Brianza (IT); STMicroelectronics SA, Montrouge (FR)

(72) Inventors: Roberta Vittimani, Agrate Brianza (IT); Federico Goller, Turin (IT); Riccardo Angrilli, Cremona (IT); Charles Aubenas, Paris (FR)

(73) Assignees: STMicroelectronics S.r.l., Agrate Brianza (IT); STMicroelectronics France, Montrouge (FR)

( * ) Notice: Subject to any disclaimer, the term of this patent is extended or adjusted under 35 U.S.C. 154(b) by 71 days.

(21) Appl. No.: 18/109,675

(22) Filed: Feb. 14, 2023

(65) Prior Publication Data
US 2023/0259463 A1 Aug. 17, 2023

(30) Foreign Application Priority Data
Feb. 17, 2022 (IT) .................. 102022000002960

(51) Int. Cl.
*G06F 12/14* (2006.01)
(52) U.S. Cl.
CPC ...... *G06F 12/1441* (2013.01); *G06F 12/1458* (2013.01)
(58) Field of Classification Search
CPC .. G06F 12/14; G06F 12/1441; G06F 12/1458; G06F 12/0284; G06F 12/0292;
(Continued)

(56) References Cited

U.S. PATENT DOCUMENTS 5,210,850 A * 5/1993 Kelly ................. G06F 12/0888
710/220
5,890,199 A * 3/1999 Downs .................... G11C 11/22
711/149
(Continued)

FOREIGN PATENT DOCUMENTS

EP 3731102 A1 10/2020
KR 1020060038981 A 5/2006

OTHER PUBLICATIONS

IT Search Report and Written Opinion for priority application, IT 102022000002960, report dated Sep. 29, 2022, 14 pgs.

*Primary Examiner* — Hiep T Nguyen
(74) *Attorney, Agent, or Firm* — Crowe & Dunlevy LLC

(57) ABSTRACT

A processing system includes a communication system and a processing core configured to generate write requests. A circuit has associated a slave interface circuit configured to manage an address sub-range and selectively forward write requests addressed to a given address. Configuration data specifies whether the given address is protected/unprotected and locked/unlocked. In response to a received write request, address and data are extracted and a determination based on the configuration data is made as to whether the extracted address is protected/unprotected, and locked/unlocked. When the extracted address is unprotected or unlocked, the slave interface forwards the write request. When the extracted address is protected and locked, the slave interface generates an unlock signal in response to a comparison of the extracted address with the extracted data, with the unlock signal being asserted when the extracted data satisfy a predetermined rule with respect to the extracted address.

23 Claims, 6 Drawing Sheets

(58) Field of Classification Search
CPC ...... G06F 12/109; G06F 13/28; G06F 13/423; G06F 13/4068; G06F 13/4282; G06F 2212/1032; G06F 2212/152; G06F 2212/1052; H04L 12/40
See application file for complete search history.

(56) References Cited

U.S. PATENT DOCUMENTS

| | | | |
|---|---|---|---|
| 2002/0018657 A1* | 2/2002 | Serizawa | G03G 15/0848 399/27 |
| 2006/0168414 A1* | 7/2006 | Nobunaga | G11C 16/22 711/163 |
| 2008/0250509 A1 | 10/2008 | Ahvenainen | |
| 2013/0073827 A1* | 3/2013 | Moyer | G06F 12/1483 711/E12.091 |
| 2014/0258599 A1* | 9/2014 | Rostoker | G06F 3/0679 711/163 |
| 2017/0220489 A1 | 8/2017 | Ahmed et al. | |
| 2019/0196734 A1 | 6/2019 | Doudna et al. | |
| 2023/0027826 A1* | 1/2023 | Sharma | G06F 11/2215 |
| 2023/0028438 A1* | 1/2023 | Ware | G06F 11/1068 |

* cited by examiner

PROCESSING SYSTEM, RELATED INTEGRATED CIRCUIT, DEVICE AND METHOD

PRIORITY CLAIM

This application claims the priority benefit of Italian Application for Patent No. 102022000002960 filed on Feb. 17, 2022, the content of which is hereby incorporated by reference in its entirety to the maximum extent allowable by law.

TECHNICAL FIELD

Embodiments of the present disclosure relate to processing systems, such as microcontrollers.

BACKGROUND

FIG. 1 shows a typical electronic system, such as the electronic system of a vehicle, comprising a plurality of processing systems (PS) 10, such as embedded systems or integrated circuits (for example, a Field Programmable Gate Array (FPGA)), a Digital Signal Processor (DSP) or a micro-controller (for example, dedicated to the automotive market).

For example, in FIG. 1 are shown three processing systems 101, 102 and 103 connected through a suitable communication system 20. For example, the communication system may include a vehicle control bus, such as a Controller Area Network (CAN) bus and/or Ethernet, and possibly a multimedia bus, such as a Media Oriented Systems Transport (MOST) bus, connected to vehicle control bus via a gateway. Typically, the processing systems 10 are located at different positions of the vehicle and may include, for example, an Engine Control Unit, a Transmission Control Unit (TCU), an Anti-lock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, such as a micro-controller, which may be used as any of the processing systems 10 of FIG. 1.

In the example considered, the processing system 10 comprises a microprocessor (MP) 102, usually the Central Processing Unit (CPU), programmed via software instructions. Usually, the software executed by the microprocessor 102 is stored in a non-volatile program memory (M) 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data (for example, calibration data).

The microprocessor 102 usually has associated also a volatile memory (VM) 104b, such as a Random-Access-Memory (RAM). For example, the memory 104b may be used to store temporary data.

As shown in FIG. 2, usually the communication with the memories 104 and/or 104b is performed via one or more memory controllers (MC) 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected, for example, to the microprocessor 102 via the traces of a printed circuit board.

In the example considered, the microprocessor 102 may have associated one or more (hardware) resources 106 selected from the group of: one or more communication interfaces IF for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or one or more analog-to-digital converters AD and/or digital-to-analog converters DA; and/or one or more dedicated digital components DC, such as hardware timers and/or counters, or a cryptographic co-processor; and/or one or more analog components AC, such as comparators, sensors, such as a temperature sensor, etc.; and/or one or more mixed signal components MSC, such as a PWM (Pulse-Width Modulation) driver.

Generally, a dedicated digital component DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor(s) 102 is determined by the firmware stored in the memory 104 (for example, the software instructions to be executed by a microprocessor 102 of a micro-controller 10). Thus, by installing a different firmware, the same hardware (micro-controller) can be used for different applications.

In this respect, future generation of such processing systems 10, for example microcontrollers adapted to be used in automotive applications, are expected to exhibit an increase in complexity, mainly due to the increasing number of requested functionalities (new protocols, new features, etc.) and to the tight constraints of execution conditions (for example, lower power consumption, increased calculation power and speed, etc.).

For example, recently more complex multi-core processing systems 10 have been proposed. For example, such multi-core processing systems may be used to execute (in parallel) several of the processing systems 10 shown in FIG. 1, such as several processing systems of a vehicle.

FIG. 3 shows an example of a multi-core processing system 10. Specifically, in the example considered, the processing system 10 comprises a plurality of n processing cores (PC) $102_1, \ldots, 102_n$ connected to a (on-chip) communication system 114. For example, in the context of real-time control systems, the processing cores $102_1, \ldots, 102_n$ may be ARM Cortex®-R52 cores. Generally, the communication system 114 may comprise one or more bus systems, for example based on the Advanced eXtensible Interface (AXI) and/or a Network-on-Chip (NoC).

For example, as shown at the example of the processing core $102_1$, each processing core 102 may comprise a microprocessor 1020 and a communication interface 1022 configured to manage the communication between the microprocessor 1020 and the communication system 114. Typically, the interface 1022 is a master interface configured to forward a given (read or write) request from the microprocessor 1020 to the communication system 114, and forward an optional response from the communication system 114 to the microprocessor 1020. However, each microprocessor 1020 may also have associated a slave interface

1024. For example, in this way, a first microprocessor 1020 may send a request to a second microprocessor 1020 (via the master interface 1022 of the first microprocessor, the communication system 114 and the slave interface 1024 of the second microprocessor).

Generally, each processing core $102_1, \ldots, 102_n$ may also comprise further local resources, such as one or more local memories 1026, usually identified as Tightly Coupled Memory (TCM).

As mentioned before, typically the processing cores $102_1, \ldots, 102_n$ are arranged to exchange data with a non-volatile memory 104 and/or a volatile memory 104b. In a multi-core processing system 10, often these memories are system memories, such as shared for the processing cores $102_1, \ldots, 102_n$. As mentioned before, each of the processing cores $102_1, \ldots, 102_n$ may, however, comprise one or more additional local memories 1026.

For example, as shown in FIG. 3, the processing system 10 may comprise one or more memory controllers 100 configured to connect at least one non-volatile memory 104 and at least one volatile memory 104b to the communication system 114. As mentioned before, one or more of the memories 104 and/or 104b may be integrated in the integrated circuit of the processing system 10 or connected externally to the integrated circuit.

As mentioned before, the processing system 10 may comprise one or more resources 106, such as one or more communication interfaces or co-processors (for example, a cryptographic co-processor). The resources 106 are usually connected to the communication system 114 via a respective slave communication interface 1064. For example, in this way, a processing core 102 may send a request to a resource 106 and the resource returns given data. For example, for this purpose, the communication system 114 may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Generally, one or more of the resources 106 may also comprise a respective master interface 1062, often also identified as integrated Direct-Memory-Access (DMA) controller. For example, such a master interface 1062 may be useful in case the resource 106 has to start a communication in order to exchange data via (read and/or write) request with another circuit connected to the communication system 114, such as a memory 104/104b, a resource 106 or a processing core 102.

Often such processing systems 10 comprise also one or more general-purpose Direct-Memory-Access (DMA) controllers 110. Generally, a general-purpose DMA controller 110 may comprises at least one functional channel connected to a resource 106. Often the resource 106 associated with a given channel may also be selected as a function of configuration data. Specifically, a channel is either a read or write channel (which also may programmable) and has typically associated configuration data, which indicate: in case of a read channel, the memory address-range from which the DMA controller 110 should read data; and in case of a write channel, the memory address-range to which the DMA controller 110 should write data.

For example, in this way, a communication interface IF may be connected to the DMA controller 110 via two channels: a read channel configured to autonomously read data to be transmitted from a first memory range in the memory 104b and provide the data having been read to the communication interface IF (which then transmits the respective data); and a write channel configured to receive data having been received from the communication interface IF and autonomously write these data to a second memory range in the memory 104b.

Accordingly, a DMA controller 110 typically has an associated a master interface 1102 for transmitting the read or write requests to the memory controller 100. Generally, for this purpose, the master interface 1102 may be connected via a dedicated DMA channel directly to the memory controller 110 or the master interface 1102 may send the requests to the communication system 114. For example, in the latter case, the read and write requests may comprise any address managed by the communication system 114.

Similarly, instead of interfacing directly a resource 106 via a dedicated channel, a general-purpose DMA controller 110 may also be configured to exchange the data with the resource 106 via the communication system 114. For example, in the case, the DMA controller 110 may be configured to send via the master interface 1102 first a read request comprising a first address and then a write request comprising a second address.

Accordingly, typically a general-purpose DMA controller 110 also comprises a slave interface 1104 for receiving configuration data for configuring the DMA controller 110.

Typically, the slave interfaces (for example, the interfaces 1024, 1064 and/or 1104) are configured to interface one or more registers of the respective circuit. For example, these registers may be used to store configuration data for the respective circuit and/or other resource specific data, such as data to be transmitted or received in case of a communication interface or sampled data in case of an ADC.

Specifically, while the slave interfaces are shown as blocks integrated in the respective circuit, indeed a given circuit may also comprise just a register interface to one or more registers of the circuit, which is usually the case for so called IP cores. Accordingly, in this case, the slave interface may be configured to convert the requests exchanged via the communication system 114 into read or write operations to these one or more registers. Accordingly, a slave interface may indeed be part of the communication system 114, or be implemented in part within the communication system 114 and in part in the respective circuit.

For example, usually each read or write request comprises an address, wherein a univocal address of the communication system 114 is associated with each register. Typically, the address range of the communication system 114 is identified as the physical address range of the processing system 10. Accordingly, a slave interface may be configured to manage one or more of the registers and detect requests comprising an address associated with a register managed by the slave interface. In case of a read request, the slave interface may thus read the content of the register associated with the address included in the request, and send the respective content (for example, via a respective response message) to the communication system 114. Conversely, in case of a read request, the slave interface may store the data included in the write request to the register associated with the address included in the request. For example, for this purpose, a given slave interface may monitor the communications exchanges via a bus 114. Conversely, in case of a system interconnect, such as a Network Interconnect Controller (NIC) or NoC, at least part of the slave interface may indeed be implemented in a NIC or NoC communication interface between system interconnect 114 and the respective circuit.

The inventors have observed that the registers of the various circuits of the processing system 10 may also store data, which may be relevant from a safety point of view. For example, this applies to one or more of the registers of a processing core 102, a resource 106 or a DMA controller 110.

In this respect, the access protection within multi-core processing systems and/or processing systems executing different software tasks or even virtual machines, is usually managed by assigning access rights to each processing core 102, each virtual machine and/or each software task. For example, in many processing systems 10, this problem is solved by using a software and/or hardware address range protection.

For example, the ARM AArch64 architecture may use a Virtual Memory System Architecture (VMSA), wherein a Memory Management Unit (MMU) of each processing core 102 is used to map virtual addresses (VA) to physical addresses (PA) of the communication system 114 via so called translation tables (TTB). Due to the fact that the physical address ranges of the communication system 114 are associated with memory ranges in the memories 104 and/or 104b, and the resources 106, it is thus possible to limit the read and write access rights of a given application APP or the operating system OS to given memory ranges and/or resources 106.

Conversely, the ARM AArch32 typically uses a Protected Memory System Architecture (PMSA) rather than a VMSA. In this case, the processing system comprises a Memory Protection Unit (MPU). Specifically, instead of defining the mapping of virtual addresses to physical addresses, the MPU permits to specify, for example via a table, one or more memory regions in the physical address space and permits to specify the respective access rights and memory attributes. For example, this access-right table of the OS and the applications APP may be implemented in the exception level EL1.

Accordingly, by using a MMU or MPU, the processing system 10 is configured to selectively inhibit the forwarding of requests from a master interface (such as a master interface 1022 of a processing core 102) to the communication system 114. Conversely, Italian Patent Application No. 102021000011639 corresponding to U.S. patent application Ser. No. 17/736,590 filed May 4, 2022 and published European Application EP 4086763 (incorporated herein by reference) discloses a solution wherein one or more of the slave interfaces implement a firewall function, such that the slave interface itself is configured to selectively inhibit the forwarding of requests from the communication system 114 to the respective circuit.

Accordingly, these solutions permit to define access rights, which may be used to determine whether a write request corresponds to an authorized write request generated by an authorized processing core, virtual machines and/or software tasks. However, these solutions are unable to verify whether an authorized write request has been generated indeed by error or unintentionally.

In view of the above, there is a need in the art to provide improved solutions for managing write accesses to registers containing safety relevant data.

SUMMARY

One or more embodiments relate to a processing system. Embodiments moreover concern a related integrated circuit, device and method.

The processing system comprises a communication system having a given physical address range and a processing core comprising a microprocessor configured to execute software instructions and having associated a master interface circuit configured to forward write requests from the microprocessor to the communication system, wherein the write request comprises a physical address of the physical address range and data to be written to the physical address.

Accordingly, a circuit may have associated a slave interface circuit configured to manage an address sub-range and selectively forward write requests addressed to a given address from the communication system to the circuit. For example, the circuit may comprise one or more registers and one or more peripheral circuits configured to exchange data with the one or more registers. In this case, a respective given address may be associated with each of the one or more registers and the slave interface circuit may be configured to selectively forward the write requests by determining the register associated with the address extracted from the write request and storing the data extracted from the write request to the respective register. For example, in various embodiments, the slave interface circuit is a peripheral bridge, wherein the one or more registers are connected to the slave interface circuit via a peripheral bus.

In various embodiments, the slave interface circuit has associated configuration data indicating whether the given address is protected or unprotected and comprises a (volatile) memory (such as being implemented with registers) for storing additional configuration data indicating whether the given address is locked or unlocked. For example, the configuration data may indicate for each of the one or more registers whether the respective address is protected or unprotected.

Specifically, in various embodiments, the slave interface circuit is configured to receive a write request addressed to the given address from the communication system, extract from the received write request the respective address and data, and determine whether the configuration data indicate that the extracted address is protected or unprotected, and whether the additional configuration data indicate that the extracted address is locked or unlocked.

Specifically, in response to determining that the extracted address is unprotected or the extracted address is unlocked, the slave interface circuit may forward the write request to the circuit. Conversely, in response to determining that the extracted address is protected and the extracted address is locked, the slave interface circuit generates an unlock signal via a combinational logic operation.

Specifically, in various embodiments, the combinational logic operation is configured to compare the extracted address with the extracted data, thereby asserting the unlock signal when the extracted data satisfy a predetermined rule with respect to the extracted address. Accordingly, in various embodiments, the protection may be unlocked when the data included in a write request satisfy a given rule with respect to the respective address included in the write request, thereby avoiding the risk that a given protection is unlocked unintentionally. For example, in various embodiments, the slave interface circuit is configured to generate the unlock signal by comparing one or more bits of the extracted address with one or more bits of the extracted data. More specifically, in various embodiments, the slave interface circuit is configured to assert the unlock signal when the extracted address corresponds to the extracted data.

Accordingly, when the unlock signal is asserted, the slave interface circuit may update the additional configuration data in order to indicate that the extracted address is unlocked. For example, in various embodiments, the additional configuration data comprise a temporary address value. In this case, the slave interface circuit may unlock an extracted address by storing the extracted address as the temporary address value. For example, in this case, the slave interface circuit may determine whether an extracted address is locked or unlocked by comparing the extracted address with the temporary address signal.

Conversely, when the unlock signal is de-asserted, the slave interface circuit may update the additional configuration data in order to indicate that the extracted address is locked. For example, in order to lock the extracted address, the slave interface circuit may update the additional configuration data in order to indicate that all addresses managed by the slave interface address are locked.

In various embodiments, in response to determining that the extracted address is unprotected or the extracted address is unlocked, which thus implies that the write request is forwarded, the slave interface circuit may also update the additional configuration data in order to indicate that the extracted address is locked, thereby locking the address again once the write request has been executed.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
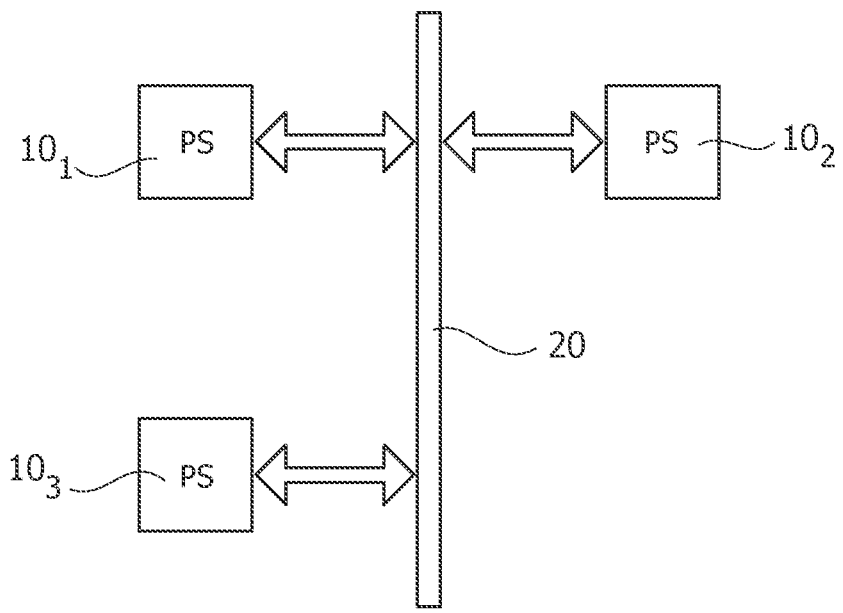
FIG. 1 shows an example of an electronic system comprising a plurality of processing systems.
Figure 3:
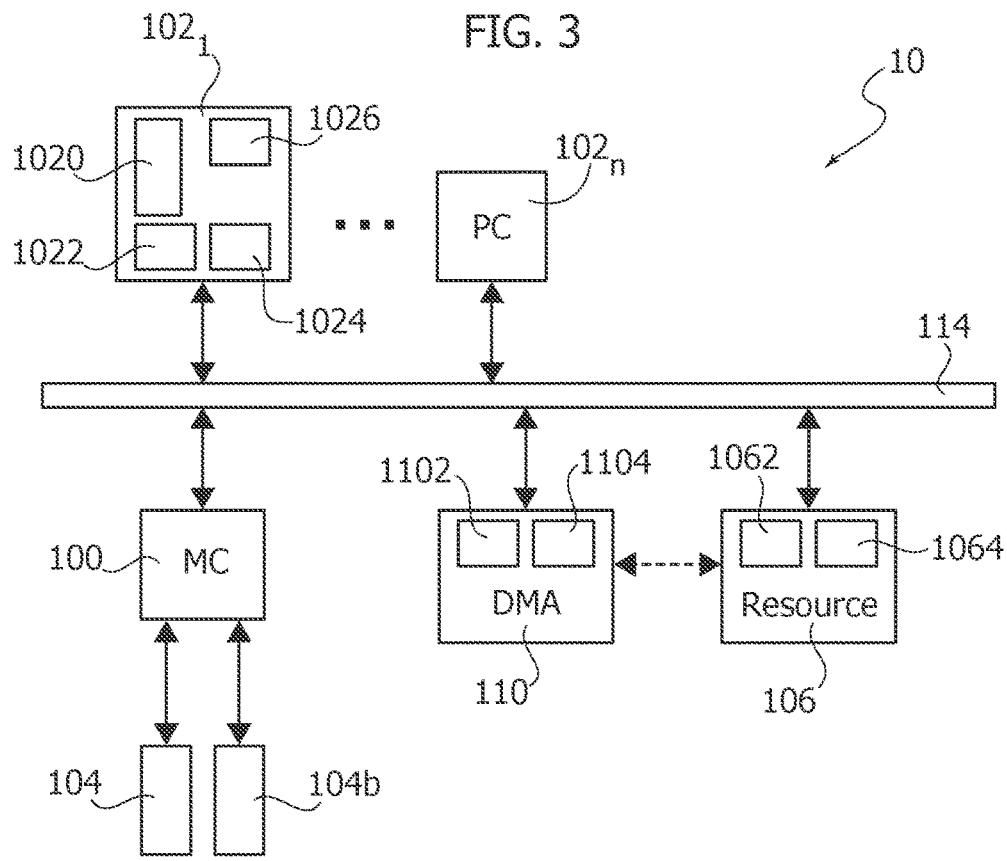
FIG. 3 shows an example of a multi-core processing system.

In the following FIG. 4 to 9 parts, elements or components which have already been described with reference to FIGS. 1 and 3 are denoted by the same references previously used in such Figures; the description of such previously described elements will not be repeated in the following in order not to overburden the present detailed description.

As mentioned before, various embodiments of the present disclosure relate to solutions for blocking erroneous or unintended write requests sent via a communication system of a processing system, such as a microcontroller.

Figure 4:
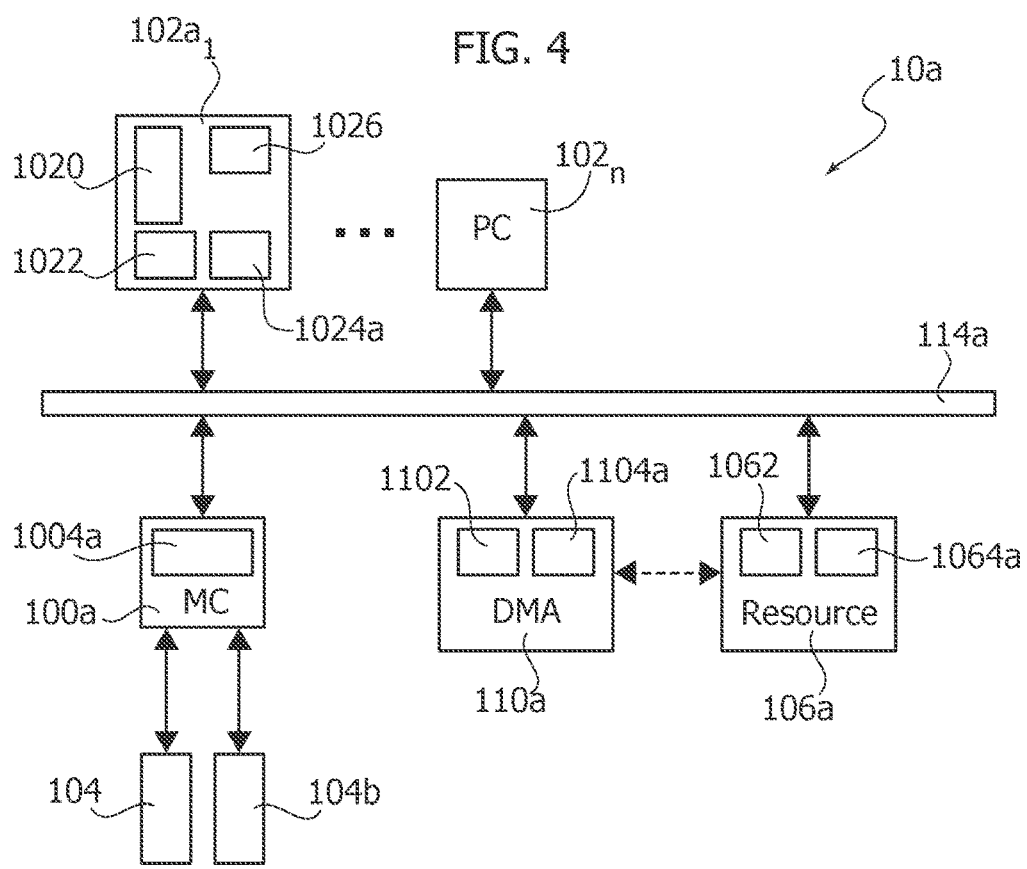
FIG. 4 shows an embodiment of a processing system according to the present disclosure.

FIG. 4 shows an embodiment of a processing system $10a$ according to the present disclosure. Specifically, the general architecture of the processing system $10a$ corresponds to the architecture described with respect to FIG. 3, and the respective description applies in its entirety.

Specifically, also in this case, the processing system $10a$ comprises: a communication system $114a$, such as a system bus, a NIC or a NoC; one or more processing cores (PC) $102a$, such as processing cores $102a_1, \ldots, 102a_n$, wherein each processing core 102 comprises a software programmable microprocessor 1020, a master interface 1022 and optionally a slave interface $1024a$; and at least one peripheral/resource 106 having a slave interface $1064a$, and optionally a master interface 1062.

In various embodiments, the processing system $10a$ comprises also a memory controller (MC) $100a$ comprising a slave interface $1004a$ for receiving read and/or write requests from the communication system $114a$, wherein the read or write requests are used to read data from or store data to a non-volatile memory 104 and/or a volatile memory $104b$.

In various embodiments, the processing system $10a$ comprises also a DMA controller $110a$ comprising a master interface 1102 for sending read and/or write requests to the communication system $114a$, and optionally a slave interface $1104a$ for receiving configuration data for the DMA controller $110a$.

Figure 5:
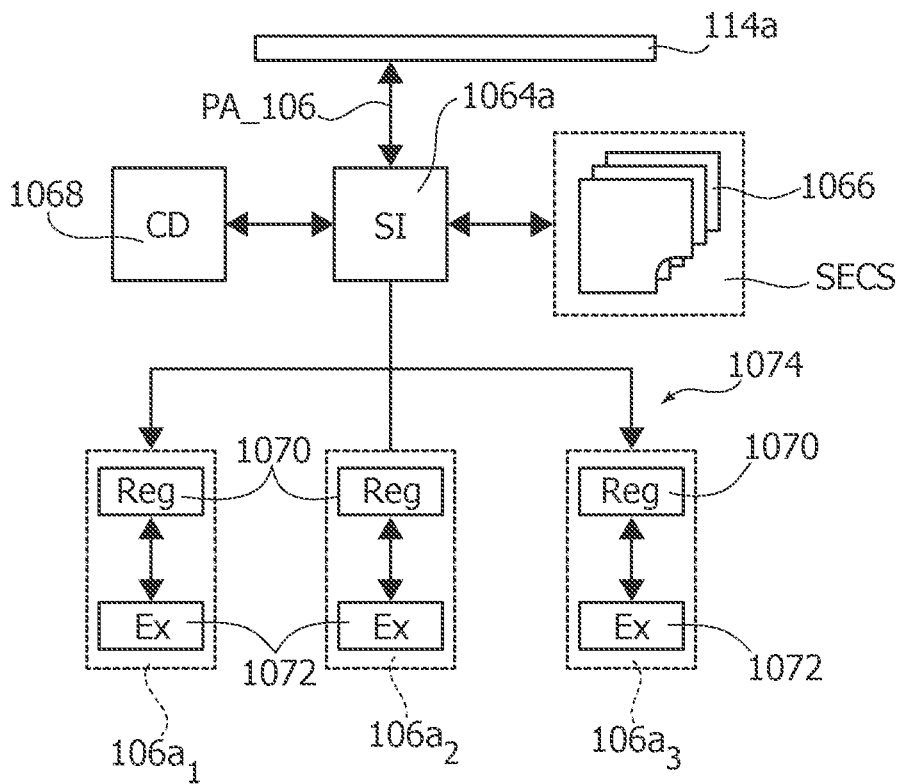
FIG. 5 shows an embodiment of a slave interface, such as a peripheral bridge, for the processing system of FIG. 4.

Generally, a slave interface, such as a slave interface $1004a$, $1024a$, $1104a$ or $1064a$, has associated a respective physical address or address range of the communication system $114a$. For example, this is shown in FIG. 5 wherein a slave interface (SI) $1064a$ associated with a resource $106a$ has associated a respective physical address or address range PA 106. Generally, each slave interface has associated a different and univocal address or address range within the physical address range of the communication system $114a$ (in other words, the various slave interfaces have associated non-overlapping addresses or address ranges).

Figure 2:
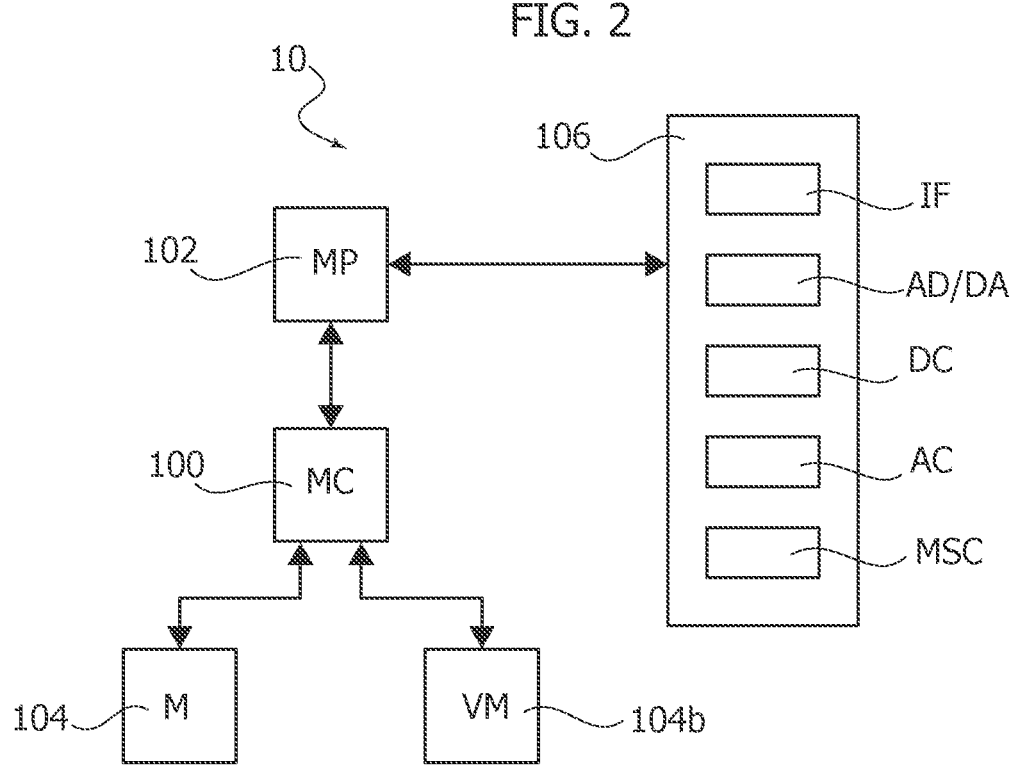
FIG. 2 shows an example of a processing system, such as a microcontroller.

Specifically, as shown in FIG. 5 at the example of a slave interface $1064a$, a given slave interface may be associated with one or more resources $106a$ or other circuits of the processing system $10a$ (such as resources $106a_1$, $106a_2$ and $106a_3$) wherein each resource/circuit comprises one or more registers (Reg) 1070. Generally, each circuit/resource comprises also a circuit (Ex) 1072 configured to exchange data with the one or more respective registers 1070. For example, in line with the description of FIG. 2, in case of a resource/peripheral $106a$, the circuit 1072 may be a communication interface IF, an analog-to-digital converter AD, a digital-to-analog converter DA, a dedicated digital component DC, an analog component AC or a mixed signal component MSC. Accordingly, each register 1070 may be used to store data to be provided to the circuit 1072, such as configuration data or data to be transmitted and/or processed by the circuit 1072, and/or data received from the circuit 1072, such as data received, sampled and/or processed by the circuit 1072.

Accordingly, in various embodiments, each of the registers 1070 managed by a given slave interface may have associated a respective univocal address and may be configured to receive via the communication system 114a a read and/or write request. In response to receiving a read or write request, the slave interface may determine the address included in the request and determine whether the address is associated with a register 1070 managed by slave interface. Accordingly, in response to determining that the request is a read request including an address associated with a given register 1070 managed by the slave interface, the slave interface may read the content of the given register 1070 and send the content of the given register 1070 to the communication interface 114a (for example, via a response packet). Conversely, in response to determining that the request is a write request including an address associated with a given register 1070 managed by the slave interface, the slave interface may store the data included in the write request to the given register 1070.

Generally, any suitable communication system 1074 may be used for exchanging data between the slave interface and the registers 1070 managed by a given slave interface. For example, the slave interface may communicate independently (via dedicated connections) with one or more of the managed registers 1070 and/or the slave interface may be connected to one or more of the registers 1070 via a bus. For example, in various embodiments, the slave interface 1064a may be a so-called peripheral bus interface, wherein the slave interface 1064a is connected to the managed registers 1070 via one or more bus systems 1074, usually called peripheral bus. Accordingly, the slave interface 1064a may be a peripheral bridge configured to interface the communication system 114a, such as a NIC or NoC, with a plurality of resources/peripherals 106a by routing read or write requests (i.e., transactions) to one or more of the registers 1070. Generally, a slave interface may also process the received data (for example in order to perform a protocol conversion operation), verify one or more Error Correction Code (ECC) bits included in the requests, and/or add one or more ECC bits to a response packet.

Accordingly, a master interface, such as a master interface 1022, 1062 or 1102, may be configured to send read requests RREQ or write requests WREQ to the communication system 114a and eventually receive a respective response to the request from the communication system 114a. Accordingly, in this way, a microprocessor 1020 may program a given register 1070 of a resource 106a by sending a write request WREQ to the communication system 114a, wherein the write request comprises the physical address associated with the respective register 1070 and managed by the slave interface 1064a associated with the resource 106a.

As mentioned before, in a safety critical system, unwanted modifications of one or more of the registers of the processing system 10a may result in dangerous situation. For example, this may be the case for a sub-set of the registers 1070 of the resources/peripherals 106a.

Specifically, in various embodiments, at least one of the slave interfaces of the processing system 10a, such as the slave interface 1064a, has associated configuration data (CD) 1068, which specifying the registers 1070 managed by the slave interfaces to be protected.

Generally, the configuration data for each register 1070 managed by a slave interface may be fixed (for example, hardwired) or may be programmable. Thus, the slave interface 1070 may be configured to: enable always the protection for a given register 1070 (without considering the configuration data 1068); enable the protection for a given register 1070 as a function of the configuration data 1068; or disable always the protection for a given register 1070 (without considering the configuration data 1068).

Figure 6:
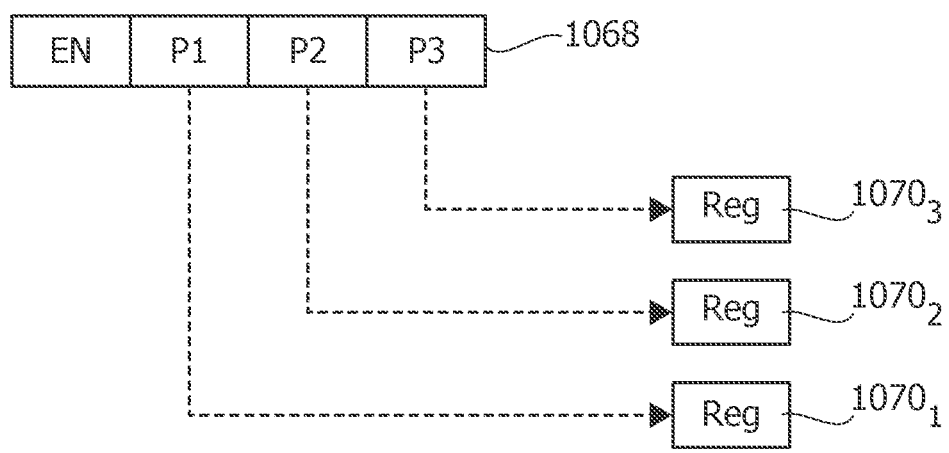
FIG. 6 shows an embodiment of configuration data used to specify protected registers for the slave interface of FIG. 5.

For example, FIG. 6 shows an embodiment of the configuration data 1068 for a plurality of registers 1070 managed by the slave interface.

Specifically, in the embodiment considered, the configuration data 1068 comprise for each register 1070 managed by the slave interface one or more respective bits P, which specify whether the protection should be disabled or enabled for the respective register (for example, such as bits P1, P2 and P3 for registers $1070_1$, $1070_2$ and $1070_3$).

In various embodiments, the configuration data 1068 may also comprise one or more bits EN which specify whether the slave interface should consider the configuration bits P. For example, in this way, the slave interface may be configured to: disable the protection for the managed registers 1070 when the enable bit(s) EN have a first value (EN="0"); and selectively enable the protection for each register 1070 as a function of the respective bit(s) P when the enable bit(s) EN have a second value (EN="1").

As mentioned before, in various embodiments, one or more of the bits of the configuration data 1068 may be fixed (for example, hardwired) or programmable. For example, in various embodiments, at least part of the bits P may be hardwired, because safety relevant registers 1070 may be determined during the design phase. In this respect, the programmability of the bits of the configuration data 1068 may be implemented: by using configuration data, which are read via a dedicated hardware circuit from a non-volatile memory (such as the memory 104) during the start-up of the processing system, such as configuration data programmed by a producer of the integrated circuit of the processing system 10a; and/or by using as register 1068 a register being programmable by sending write requests, for example via a microprocessor 1020, to the communication system 114a.

Figure 7:
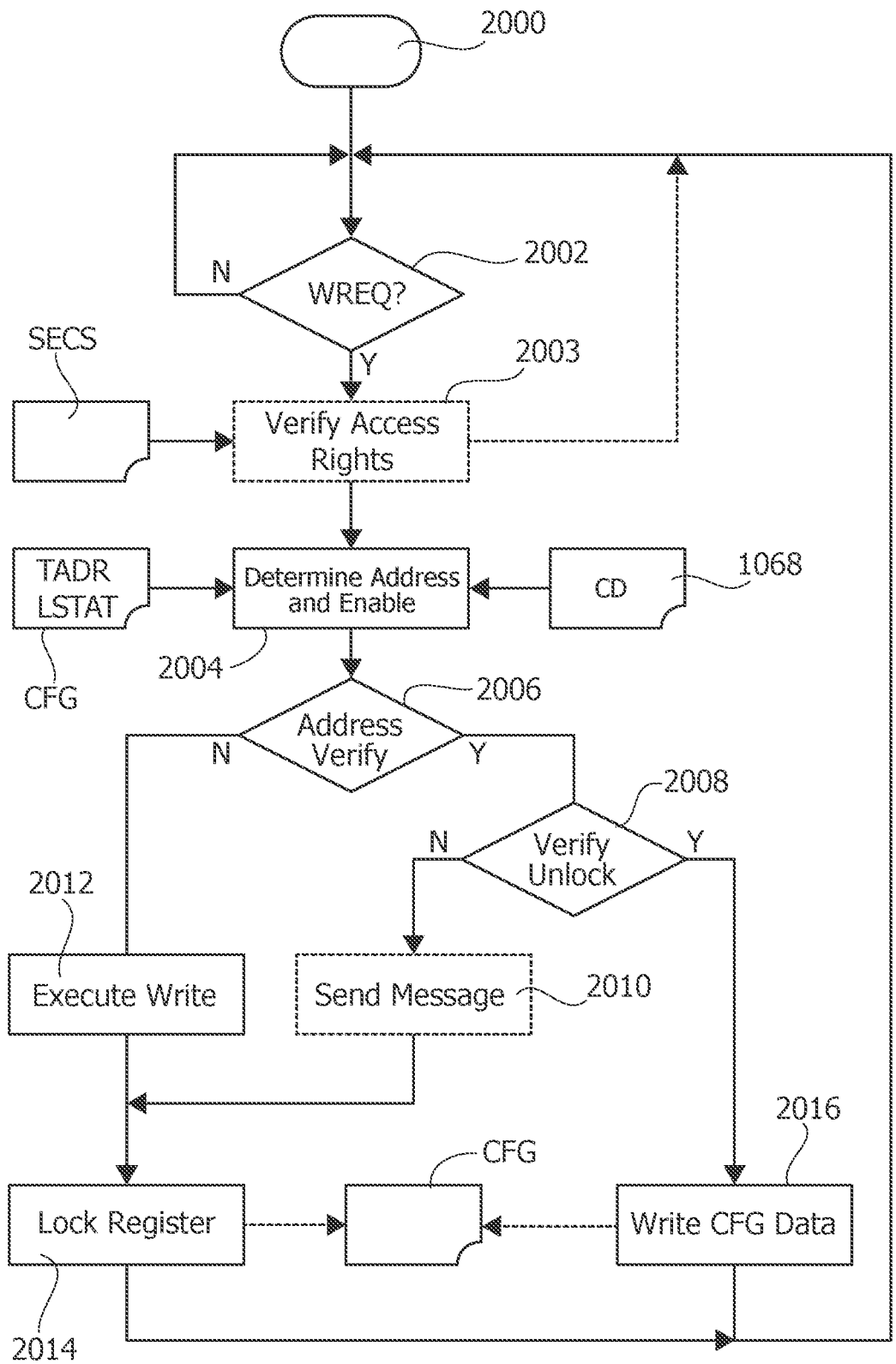
FIG. 7 shows an embodiment of the operation of the slave interface of FIG. 5.

FIG. 7 shows in this respect an embodiment of the operation of the slave interface 1064a, such as a peripheral bridge.

Specifically, after a start step 2000, which may correspond to the start-up of the processing system, the slave interface proceeds to a wait step 2002 in order to wait for a new write request WREQ to an address ADR managed by the slave interface.

For example, in various embodiments, the wait step 2002 may be implemented with a verification step, where the slave interface verifies whether a write request WREQ has been received and, once having received a write request, whether the write request WREQ comprises an address ADR managed by the slave interface. Accordingly, in case the slave interface has not received a write request WREQ to an address managed by the slave interface (output "N" of the verification step 2002), the slave interface returns to the step 2002.

Conversely, in case the slave interface has received a write request WREQ to an address managed by the slave interface (output "Y" of the verification step 2002), the slave interface proceeds to a step 2004. Specifically, in the embodiment considered, the slave interface is configured to determine at the step 2004 the address ADR of the write request WREQ and determine, based on the configuration data 1068, whether the protection for the register 1070 associated with the receive address ADR is enabled or disabled, for example by using the previously mentioned data EN and/or P.

Moreover, the slave interface reads at the step 2004 additional configuration data CFG. Specifically, the additional configuration data CFG correspond to temporary data which are used to indicate whether a given protected register 1070 is in a locked state or in an unlocked state. For example, in various embodiments, the additional configuration data may indicate an address TADR indicating the address of a register and optionally a status flag LSTAT indicating whether the address TADR is locked or unlocked. For example, when using just the address TADR, the address TADR may indicate that: all protected registers managed by the slave interface are in the locked state (when the address TADR is set to a value non managed by the slave interface, such as zero), or a single protected registers managed by the slave interface is in the unlocked state (when the address TADR is set to the address of the respective register).

Accordingly, in various embodiments, the slave interface may verify at a step 2006 whether the register associated with the address ADR included in the write request WREQ is protected and whether the respective register is locked or unlocked. For example, for this purpose the slave interface may use the data EN and/or P of the data 1068 in order to determine whether the register is protected, and compare the temporary address TADR with the address ADR included in the request, and optionally verify the value of the flag LSTAT.

In case the slave interface determines that the register 1070 associated with the address ADR included in the write request WREQ is not protected or the protection is unlocked (output "N" of the verification step 2006), for example because the temporary address TADR corresponds to the address ADR included in the write request WREQ and optionally the flag LSTAT indicates that the protection is unlocked, the slave interface proceeds to a step 2012. Specifically, the slave interface is configured to execute the write request at the step 2012 by storing the data DATA included in the write request (or data generated as a function of these data DATA) to the register 1070 associated with the address ADR included in the write request.

Moreover, in various embodiments, the slave interface locks again the respective protected register or preferably all protected registers at a step 2014, for example by resetting the address TADR and/or the status flag LSTAT. Generally, the step 2014 may be executed before, after or in parallel with the step 2012.

Accordingly, once the write request has been executed, the slave interface may return to the step 2002 for receiving a next write request WREQ.

Conversely, in case the slave interface determines that the register 1070 associated with the address ADR included in the write request WREQ is protected and the protection is locked (output "Y" of the verification step 2006), for example because configuration data EN and/or P indicate that the register is protected and the temporary address TADR does not correspond to the address ADR included in the write request WREQ or the optional flag LSTAT indicates that the protection is not unlocked, the slave interface proceeds to a verification step 2008.

Specifically, in the embodiment considered, the slave interface verifies at the step 2008 whether the protection of the register associated with the address ADR included in the write request WREQ should be unlocked. Specifically, for this purpose, the slave interface may verify one or more conditions at the step 2008.

For example, similar to a password protection, the slave interface could be configured to verify at the step 2008 whether a given password or reference key is provided with the request WREQ, which permits to unlock the protection. However, the inventors have observed that this solution may not be suitable in order to protect the registers 1070 against unintentional write accesses. In fact, once having provided the reference key, all registers 1070 managed by the slave interface would be unlocked. Accordingly, in order to protect each register 1070 individually against unintended write operations, each register 1070 should be protected via a respective reference key, for example the address TADR and optionally the flag LSTAT could be set when a given reference key for the specific register 1070 is provided. However, this implies that a significant number of reference keys would be required, which increases significantly the complexity of the slave interface circuit.

In this respect, the inventors have observed that a low complexity solution may be implemented by using the address associated with a given register itself as the reference key for unlocking the write access to the given register.

Accordingly, in various embodiments, the slave interface is configured to determine the address ADR and the DATA included in the write request WREQ, and the slave interface is configured to determine at the step 2008 whether the data DATA match with/correspond to the address of the protected register 1070, which may also be verified implicitly by comparing the data DATA of a write request WREQ with the respective address ADR of the same write request WREQ. Accordingly, in various embodiments, a given protected register 1070 is unlocked when the following combined conditions are satisfied: a write request WREQ is received, wherein the write request WREQ comprises an address ADR and data DATA; the address ADR corresponds to the address associated with the register 1070; and the data DATA correspond to the address associated with the register 1070.

In various embodiments, instead of verifying that the address of the register 1070 or the address ADR of the write request WREQ corresponds to the data DATA, the slave interface may also compare at the step 2008 only a subset of the bits, for example in case the address field ADR has 16 bits and the data field has 32 bits, and/or process the address ADR and/or the data DATA and compare the processed address ADR with the processed data DATA. For example, the slave interface may verify at the step 2008 whether: the data DATA have inverted bits values of the address ADR; or the data DATA correspond to a bit sequence having an inverted order from the most-significant bit to the least significant with respect to the address ADR.

Accordingly, in various embodiments, the slave interface verifies at the step 2008, preferably via a combinational logic circuit, whether a predetermined rule is satisfied, wherein this rule compares the content of the address ADR with the data DATA, for example the combinational logic circuit may receive the address ADR and the data DATA and generate a signal UNLOCK indicating whether the register 1070 associated with the address ADR should be unlocked. In this respect, a direct bit-comparison operation between one or more bits of the address ADR and one or more bits of the data DATA is advantageous, because the respective combinational logic circuit may be implemented with fewer combinational logic gates, which also do not introduce a significant propagation delay.

Accordingly, in case the slave interface determines that the protected register should be unlocked (output "Y" of the verification step 2008), the slave interface proceeds to a step 2016, where the slave interface writes the additional configuration data CFG in order to indicate that the register associated with the address ADR included in the write request is unlocked, for example by storing the value ADR to the value TADR and optionally asserting the flag LSTAT. For example, for this purpose, the slave interface may comprise an internal register configured to provide the value TADR by storing the address ADR in response to the previously mentioned signal UNLOCK.

Conversely, in case the slave interface determines that the protected register should not be unlocked (output "N" of the verification step 2008), the slave interface may proceed to the step 2002 for waiting for a new write request or to the step 2014 for locking again all protected registers. For example, for this purpose, the slave interface may reset at the step 2014 the register used to store the address TADR and/or the flag LSTAT.

Accordingly, in various embodiments, the protection mechanism operates via two write accesses. When the address ADR of a (first) write request WREQ corresponds to the address associated with a protected and locked register (step 2006), the write request WREQ is not executed, but the data DATA of the write request WREQ are used to decide whether to unlock the respective protected register.

Specifically, when the data DATA and the address ADR satisfy a given predetermined rule (step 2008), for example when the bits of the data DATA correspond to the bits of the address ADR, the slave interface removes the lock for the given register at the step 2016. In various embodiments, in this case, the slave interface may also respond (see, at the step 2016) with a message indicating that the request has been executed.

Conversely, when the data DATA and the address ADR do not satisfy the given predetermined rule (step 2008), the slave interface does not unlock the protected register. In various embodiments, in this case, the slave interface may also respond (see, at an optional step 2010), with a message indicating that the request has not been executed.

Accordingly, when the address ADR of a (second) write request WREQ corresponds to the address associated with an unprotected or unlocked register (step 2006), the write request WREQ is executed, for example the data DATA are stored to the respective register 1070. As mentioned before, in various embodiments only a single protected register 1070 may be unlocked. Accordingly, write operations to other locked registers will not be processed.

Figure 8:
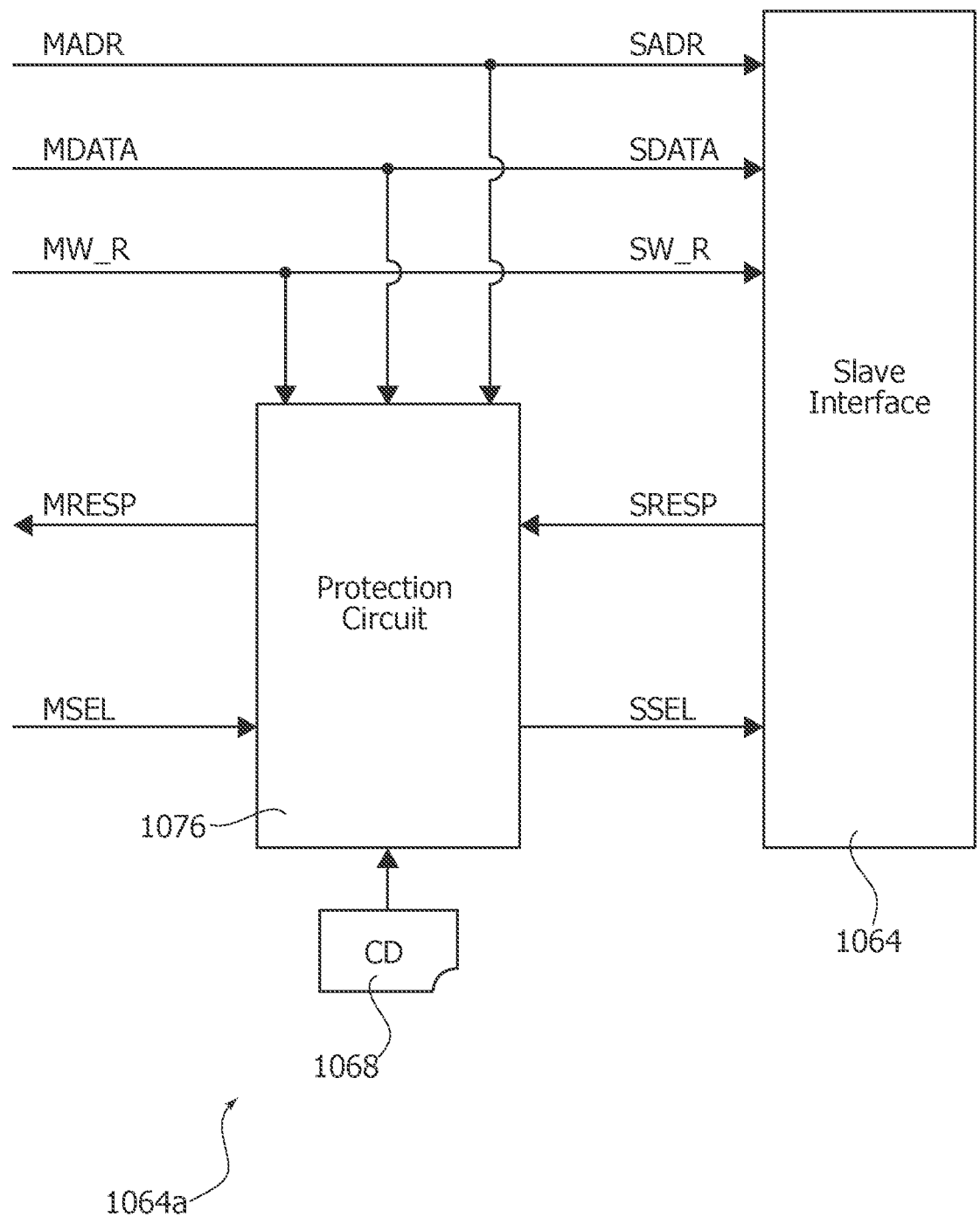
FIGS. 8 and 9 shows an embodiment of an implementation of the slave interface of FIG. 5.

FIG. 8 shows a possible embodiment of a slave interface circuit according to the present disclosure, such as a slave interface 1064*a*.

Specifically, in the embodiment considered, the communication system 114*a* is configured to provide to the slave interface 1064*a* the following signals for each write request WREQ: a signal MSEL used to signal a request (for example by asserting the signal MSEL); a signal MW_R indicating whether the request is a write request WREQ (for example by asserting the signal W_R) or a read request RREQ; signals MDATA comprising the data to be written; and signals MADR comprising the address ADR to which the data DATA should be written.

Generally, these signals may be generated directly by a master interface connected to a bus system 114*a*, or the signals may be generated by an edge network interface of a NIC or NoC.

Moreover, in various embodiments, the communication system 114*a* may be configured to receive from the slave interface 1064*a* an optional signal MRESP indicating a status response to the request. Generally, the communication may also be based on further signals which are not shown in FIG. 8, such as a signal RDATA for the data of a read request RREQ and/or additional ECC bits.

In the embodiment considered, the slave interface 1064*a* comprises a conventional slave interface 1064 and a protection circuit 1076 configured to manage the protection mechanism based on the configuration data 1068.

Specifically, the slave interface 1064 is configured to receive the following signals: a signal SSEL used to signal a request (for example by asserting the signal SEL); a signal SW_R indicating whether the request is a write request WREQ (for example when the signal W_R is asserted) or a read request RREQ; signals SDATA comprising the data to be written; and signals SADR comprising the address ADR to which the data DATA should be written.

Moreover, in various embodiments, the slave interface 1064 may be configured to generate an optional signal SRESP indicating a status response for the request.

Accordingly, in a conventional prior-art slave interface 1064, the signals MADR, MDATA, MW_R, MRESP and MSEL would be connected (for example, directly) to the signals SADR, SDATA, SW_R, SRESP and SSEL, respectively. Conversely, in the embodiment considered, the signal SSEL and optionally the signal MRESP are generated by the protection circuit 1076 as a function of the signals MSEL, MW_R, MADR, MREQ and optionally SRESP.

Figure 9:
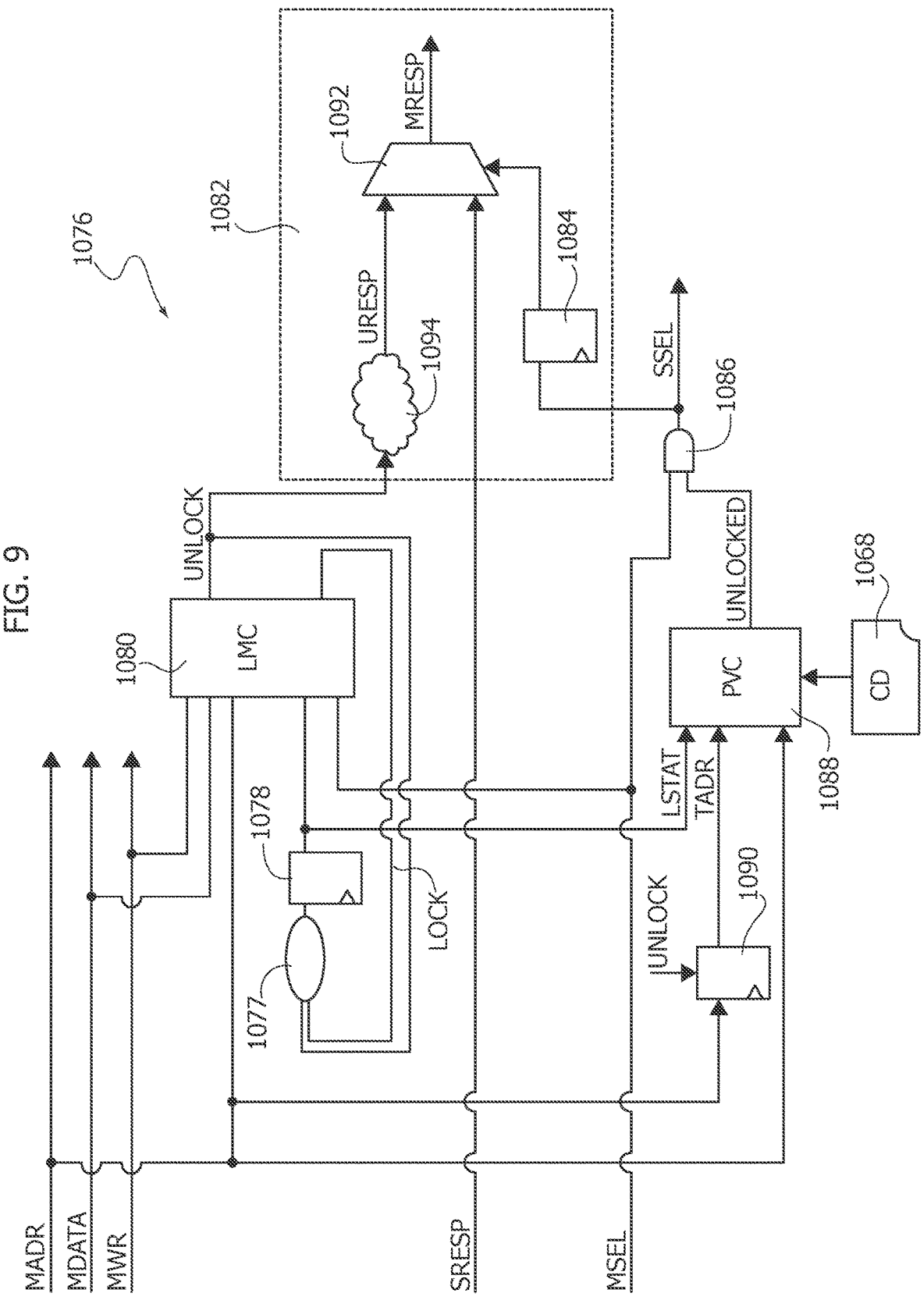

FIG. 9 shows a possible embodiment to the protection circuit 1076.

Specifically, in the embodiment considered, the address MADR and the data MDATA are provided to a lock management circuit (LMC) 1080. Specifically, in the embodiment considered, the circuit 1080 is configured to generate a lock signal LOCK and/or an unlock signal UNLOCK by comparing the signals MDATA and MADR when a new write request WREQ is received (for example, when the signal MW_R is asserted and optionally when the signal MSEL is asserted).

Specifically, when a write request is received, the lock management circuit 1080 may be configured to store the address MADR to a register 1090, wherein the register 1090 provides the previously mentioned temporary address value TADR indicating the address of an unlocked address. For example, in the embodiment considered, the register 1090 is configured to store the address MADR in response to the unlock signal UNLOCK, wherein the circuit 1080 asserts the UNLOCK signal in response to determining that the signals MSEL and MW_R are asserted, and the signals MDATA corresponds to the signals MADR. Accordingly, the lock management circuit 1080 may be implemented with a (simple) combinational logic circuit.

As mentioned before, in various embodiments the register 1090 could be reset in response to the lock signal LOCK (step 2014 of FIG. 7). Conversely, in the embodiment considered, the register 1090 is not reset, but an additional register 1078 is used to store explicitly the lock state LSTAT. Generally, as shown via a combinational logic circuit 1077, any suitable solution may be used to store a flag LSTAT indicating whether the protection is locked or unlocked. For example, in various embodiments, the protection circuit 1076 comprises a set-reset flip flop 1078, wherein the set input is connected to the signal UNLOCK and the reset input is connected to the signal LOCK, whereby the signal LSTAT is asserted to signal an unlocked state. However, the signal LSTAT could also indicate the locked state.

Accordingly, in the embodiment considered, the protection circuit 1076 comprises also a protection verification (or transaction filter) circuit (PVC) 1088 configured to generate a signal UNLOCKED indicating whether the access to a given address is permitted/unlocked.

Specifically, in the embodiment considered, the circuit 1088 is configured to receive the value TADR indicating an unlocked address (from the register 1090), the address MADR indicating the address of the write request WREQ, the configuration data 1068 indicating which addresses are protected or unprotected and optionally the lock status LSTAT (e.g., in case the lock status may not be derived from the value TADR).

Specifically, in various embodiments, the circuit 1088 is configured to determine, based on the signal MADR and the configuration data 1068, whether the current address MADR is protected or unprotected. Moreover, in various embodiments, the circuit 1088 is configured to determine, based on the signal MADR and the value TADR (and optionally LSTAT), whether the protection of the current address MADR is locked or unlocked. Accordingly, in various embodiments, the circuit 1088 may assert the signal UNLOCKED in response to determining that the address MADR is unprotected or the protection of the address MADR is unlocked. Accordingly, also the transaction filter circuit 1088 may be implemented with a (simple) combinational logic circuit.

Accordingly, in the embodiment considered, the signal SSEL may be asserted when the signal MSEL is asserted and the signal UNLOCKED is asserted, thereby signaling the write request WREQ to the slave interface 1064 only in case the signal UNLOCKED is asserted. For example, assuming that a signal is asserted via the logic level "1", the signal SSEL may be generated via a logic AND gate 1086 receiving at input the signals MSEL and UNLOCKED As mentioned before, in various embodiments, the slave circuit 1064 may also generate a response signal SRESP. In this case, the protection circuit 1076 may comprise a lock response generator circuit 1082. Specifically, as mentioned before, the response MRESP provided to the communication system 114a should correspond to: the response SRESP provided by the slave interface 1064 in case the write request is provided to the slave interface 1064; a response indicating a correct execution of the (unlock) command in case the write request results in an unlocking of the protection; and otherwise, a response indicating an error in the execution of the (unlock) command.

Specifically, in the embodiment considered, the lock response generator circuit 1082 comprises: a combinational logic circuit 1094 configured to generate a response signal URESP to an unlock command (for example, the signal URESP correspond to the inverted version of the signal UNLOCK); and a multiplexer 1092 providing at output the signal MRESP by selecting the signal URESP or SRESP as a function of the signal SSEL indicating whether the write request is forwarded to the slave interface 1064.

Generally, due to the fact that the response should be provided usually only with the next clock cycle, the protection circuit 1076 may comprise one or more registers or flip-flops, such as a flip-flop 1084 used to store the value of the signal SSEL (indicating whether the write request is forwarded to the slave interface 1064), and the multiplexer may use the stored signal SSEL provided by the flip-flop 1084.

Accordingly, also the circuit implementation shown in FIG. 9, permits to specify via the configuration data 1068 a set of addresses to be protected, for example, by using a bit-map comprising a bit P for each address managed by the slave interface 1064.

When the address MADR of a write transaction (as signaled via the signals MW_R and MSEL) corresponds to a protected address and the protection is locked (as signaled via the signal LSTAT), the transaction is blocked by the circuit 1088 via the signal UNLOCKED In parallel, the circuit 1080 uses the data MDATA in order to decide whether to unlock the protection. Specifically, when the data MDATA are equal to the address MADR, the lock is removed for the address MADR, for example by updating the value TADR and optionally the signal LSTAT. Optionally, the circuit 1082 may also generate a response indicating that the unlock command has been executed.

Otherwise, the lock is confirmed, for example by responding via the circuit 1082 with an error status.

Conversely, when the address MADR of a write transaction (as signaled via the signals MW_R and MSEL) corresponds to an unprotected address, or a protected address and the protection is unlocked (as signaled via the value TADR and the optional signal LSTAT), the circuit 1088 permits a routing of the write request to the slave interface 1064, for example via the signal UNLOCKED. In this case, the circuit 1082 provides the response SRESP generated by the slave interface 1064 to the communication system 114a.

As schematically shown in FIG. 7 via an optional step 2003, the slave interface may also be configured to verify one or more access rights.

For example, the previously mentioned Italian Patent Application No. 102021000011639 discloses a solution wherein one or more of the slave interfaces implement a firewall function, such that the slave interface may be configured to selectively inhibit at the step 2003 the forwarding of a read request RREQ or a write request WREQ to the respective register 1070. Specifically, according to this document, which is incorporated herein by reference for this purpose, the processing system 10a may comprise a communication system 114a having a given physical address range, and one or more processing cores 102a, wherein each processing core 102a comprises at least one microprocessor 1020 configured to execute software instructions. Specifically, each microprocessor 1020 has associated a master interface circuit 1022 configured to forward read or write requests from the microprocessor 1020 to the communication system 114a, wherein the read or write requests comprise a physical address of the physical address range of the communication system 114a.

Accordingly, in line with the previous description, a slave circuit, such as a resource/peripheral 106a or a memory controller 100a, may having associated a slave interface circuit, e.g., the slave interface 1064a, configured to selectively forward read or write requests addressed to a given address sub-range from the communication system 114a to the first circuit.

Specifically, according to document 102021000011639, the master interface circuit of the microprocessor 1020 has associated a register for storing a respective virtual machine ID (VMID) and/or an Address Space ID (ASID). Specifically, in various embodiments, the master interface circuit of a microprocessor 1020 is configured to read the VMID and/or the ASID from the register and insert the VMID and/or the ASID into the read or write requests forwarded from the microprocessor 1020 to the communication system 114a, such that the VMID and/or the ASID are transmitted with the requests. Similarly, also other master interface circuits, for example of other processing cores 102a and/or a DMA controller 110, may insert a respective VMID and/or ASID in the requests.

Accordingly, in various embodiments, the slave interface circuit may determine whether the request is authorized. Specifically, for this purpose, in various embodiments, the slave interface circuit has associated a register for storing security configuration data SECS (see also FIG. 5), comprising for example a list 1066 of authorized VMID and/or ASID, wherein each item of the list 1066 is associated with a given address or address sub-range managed by the slave interface.

Specifically, in this case, the slave interface circuit may be configured to receive a read or write request addressed to the given address or address sub-range from the communication system 114, extract from the received request the VMID and/or ASID, determine the authorized VMID and/or ASID associated with the address or address sub-range as a function of the security configuration data SECS and determine whether the virtual VMID and/or ASID extracted from the received request corresponds to the authorized VMID and/or ASID, respectively.

For example, in response to determining that the VMID and/or ASID extracted from the received request corresponds to the authorized VMID and/or ASID, the slave interface circuit may forward the read or write request to the slave circuit. Conversely, in response to determining that the VMID and/or ASID extracted from the received request does not correspond to the authorized VMID and/or ASID, the slave interface circuit may inhibit forwarding the read or write request to the first circuit (for example, reject the read or write request).

For example, by using the VMID, it is possible to specify whether the microprocessor 1020 and a given slave circuit belong to the same virtual machine.

For example, in order to combine the protection mechanism against unintended write operations with the authentication mechanism, the circuit 1088 could assert the signal UNLOCKED only when also the VMID and/or ASID extracted from the received request corresponds to the respective authorized VMID and/or ASID indicated by the security configuration data SECS. Alternatively, a separate circuit may be used for the authentication, wherein the additional circuit generates a signal indicating an authorized access, and wherein this signal is provided to the logic gate 1086.

Of course, without prejudice to the principle of the invention, the details of construction and the embodiments may vary widely with respect to what has been described and illustrated herein purely by way of example, without thereby departing from the scope of the present invention, as defined by the ensuing claims.

The claims are an integral part of the technical teaching of the disclosure provided herein.

The invention claimed is:

1. A processing system, comprising:
    a communication system having a given physical address range;
    a processing core comprising: a microprocessor configured to execute software instructions and a master interface circuit associated with the microprocessor and configured to forward write requests from said microprocessor to said communication system, said write requests comprising a physical address within said physical address range and data to be written to said physical address; and
    a circuit;
    a slave interface circuit configured to manage an address sub-range and selectively forward write requests addressed to a given address from said communication system to said circuit;
    wherein said slave interface circuit includes configuration data indicating whether said given address is protected or unprotected and comprises a memory for storing additional configuration data indicating whether said given address is locked or unlocked, and wherein said slave interface circuit is configured to:
        receive a write request addressed to said given address from said communication system;
        extract data and the given address from said received write request;
        determine whether said configuration data indicate that the extracted given address is protected or unprotected, and whether said additional configuration data indicate that the extracted given address is locked or unlocked;
        in response to determining that the extracted given address is unprotected or the extracted given address is unlocked, forward said write request to said circuit;
        in response to determining that the extracted given address is protected and the extracted given address is locked, generate an unlock signal in response to a comparison of said extracted given address with said extracted data, wherein the unlock signal is:
            asserted when said extracted data satisfy a predetermined rule with respect to said extracted given address, to cause an update of said additional configuration data in order to indicate that the extracted given address is unlocked; and
            deasserted when said extracted given data does not satisfy the predetermined rule with respect to said extracted given address, to cause an update of said additional configuration data in order to indicate that the extracted given address is locked.

2. The processing system according to claim 1, wherein the update of said additional configuration data in order to indicate that the extracted given address is locked comprises updating said additional configuration data to indicate that all addresses managed by said slave interface address are locked.

3. The processing system according to claim 1, wherein said slave interface circuit is further configured to, in response to determining that the extracted given address is unprotected or the extracted given address is unlocked, update said additional configuration data in order to indicate that the extracted given address is locked.

4. The processing system according to claim 3, wherein the update of said additional configuration data in order to indicate that the extracted given address is locked comprises updating said additional configuration data in order to indicate that all addresses managed by said slave interface address are locked.

5. The processing system according to claim 1:
    wherein said additional configuration data comprise a temporary address value;
    wherein the update of said additional configuration data in order to indicate that the extracted given address is unlocked comprises storing said extracted given address as said temporary address value; and
    wherein determining whether said additional configuration data indicate that the extracted given address is locked or unlocked comprises comparing said extracted given address with said temporary address value.

6. The processing system according to claim 1, wherein said slave interface circuit is configured to generate said unlock signal by comparing one or more bits of said extracted given address with one or more bits of said extracted data.

7. The processing system according to claim 6, wherein said slave interface circuit is configured to assert said unlock signal when said extracted given address corresponds to said extracted data.

8. The processing system according to claim 1, wherein the circuit comprises one or more registers and one or more peripheral circuits configured to exchange data with said one or more registers, and wherein a respective given address is associated with each of said one or more registers and said slave interface circuit is configured to selectively forward said write requests by:

determining the register associated with the respective given address extracted from said write request, and storing said data extracted from said write request to the respective register.

9. The processing system according to claim 8, wherein said slave interface circuit is a peripheral bridge, wherein said one or more registers are connected to said slave interface circuit via a peripheral bus.

10. The processing system according to claim 8, wherein said configuration data indicate for each of said one or more registers whether the respective given address is protected or unprotected.

11. The processing system according to claim 1, wherein said slave interface circuit is configured to:

in response to determining that the extracted given address is unprotected or the extracted given address is unlocked, forward a response from said circuit to said communication system;

in response to determining that the extracted given address is protected and the extracted given address is locked, and when said unlock signal is asserted, send a response indicating that the write request has been executed; and in response to determining that the extracted given address is protected and the extracted given address is locked, and when said unlock signal is de-asserted, send a response indicating that the write request has not been executed.

12. The processing system according to claim 1:

wherein said slave interface circuit is configured to receive the configuration data, said configuration data indicating that said given address is protected;

wherein the master interface circuit is configured to send a first write request to said communication system, said first write request comprising said given address and data determined as a function of said predetermined rule as a function of said given address; and wherein the master interface circuit is further configured to send a second write request to said communication system, said second write request comprising said given address and data to be written to said given address.

13. An integrated circuit, comprising: a processing system according to claim 1.

14. A device, comprising: a plurality of processing systems, wherein each processing system is a processing system according to claim 1; and wherein said processing systems are connected via a further communication system.

15. The device according to claim 14, wherein said device is a vehicle.

16. A method for slave interface operation, comprising:

storing configuration data indicating whether a given address with an address sub-range is protected or unprotected;

storing additional configuration data indicating whether said given address is locked or unlocked;

receiving a write request addressed to said given address from a communication system;

extracting the given address and data from said received write request;

determining whether said configuration data indicate that the extracted given address is protected or unprotected;

determining whether said additional configuration data indicate that the extracted given address is locked or unlocked;

where the extracted given address is unprotected or the extracted given address is unlocked, forwarding said write request to a circuit;

where the extracted given address is protected and the extracted given address is locked, generating an unlock signal in response to a comparison of said extracted given address with said extracted data, wherein the unlock signal is:

asserted when said extracted data satisfy a predetermined rule with respect to said extracted given address, to cause an update of said additional configuration data in order to indicate that the extracted given address is unlocked; and deasserted when said extracted data do not satisfy the predetermined rule with respect to said extracted given address, to cause an update of said additional configuration data in order to indicate that the extracted given address is locked.

17. The method according to claim 16, wherein the update of said additional configuration data in order to indicate that the extracted given address is locked comprises updating said additional configuration data to indicate that all addresses managed by said slave interface address are locked.

18. The method according to claim 16, further comprising, where the extracted given address is unprotected or the extracted given address is unlocked, updating said additional configuration data in order to indicate that the extracted given address is locked.

19. The method according to claim 18, wherein the update of said additional configuration data in order to indicate that the extracted given address is locked comprises updating said additional configuration data in order to indicate that all addresses managed by said slave interface address are locked.

20. The method according to claim 16, wherein said additional configuration data comprise a temporary address value, further comprising:

storing said extracted given address as said temporary address value when updating said additional configuration data to indicate that the extracted given address is unlocked; and wherein determining whether said additional configuration data indicate that the extracted given address is locked or unlocked comprises comparing said extracted given address with said temporary address value.

21. The method according to claim 16, wherein the comparison of said extracted given address with said extracted data to generate said unlock signal comprises comparing one or more bits of said extracted given address with one or more bits of said extracted data.

22. The method according to claim 16, further comprising:

where the extracted given address is unprotected or the extracted given address is unlocked, forwarding a response from said circuit to said communication system;

where the extracted given address is protected and the extracted given address is locked, and when said unlock signal is asserted, sending a response indicating that the write request has been executed; and where the extracted address is protected and the extracted given address is locked, and when said unlock signal is de-asserted, sending a response indicating that the write request has not been executed.

23. The method according to claim 16, further comprising:
receiving a first write request to said communication system, said first write request comprising said given address and data determined as a function of said predetermined rule as a function of said given address; and
receiving a second write request to said communication system, said second write request comprising said given address and data to be written to said given address.

\* \* \* \* \*